United States Patent

Tsukada

[11] Patent Number: 5,694,811
[45] Date of Patent: Dec. 9, 1997

[54] LINEAR MOTION MACHINE WITH A LUBRICANT SUPPLY MEMBER

[75] Inventor: Toru Tsukada, Gunma, Japan

[73] Assignee: NSK Ltd., Tokyo, Japan

[21] Appl. No.: 319,729

[22] Filed: Oct. 7, 1994

[30] Foreign Application Priority Data

| Oct. 7, 1993 | [JP] | Japan | HEI.5-054555 U |
| Oct. 12, 1993 | [JP] | Japan | HEI.5-254401 |
| Oct. 25, 1993 | [JP] | Japan | HEI.5-266449 |

[51] Int. Cl.$^6$ .............. F16C 29/06; F16H 25/24
[52] U.S. Cl. ............ 74/467; 384/43; 384/13
[58] Field of Search ............. 74/467; 384/43, 384/13

[56] References Cited

U.S. PATENT DOCUMENTS

| 3,027,626 | 4/1962 | Murphy | 29/148.4 |
| 3,718,209 | 2/1973 | Moslo | 384/13 X |
| 3,955,856 | 5/1976 | Wayson et al. | 384/13 X |
| 4,239,632 | 12/1980 | Baile | 252/12 |
| 4,561,774 | 12/1985 | Takahashi et al. | 384/13 X |
| 4,582,368 | 4/1986 | Fujita et al. | 384/13 X |
| 4,582,369 | 4/1986 | Itoh | 384/13 X |
| 4,886,374 | 12/1989 | Osawa | 384/13 OR |
| 5,325,732 | 7/1994 | Vogel | 74/459 X |

FOREIGN PATENT DOCUMENTS

| 589697A1 | 3/1994 | European Pat. Off. |
| 3012018 | 10/1981 | Germany |
| 4118189 | 12/1991 | Germany |
| 4237408 | 5/1993 | Germany |
| 63-23239 | 5/1988 | Japan |

OTHER PUBLICATIONS

JP 1-98752 (A) Pat. Abstr. of Japan, M-850 Jul. 14, 1989, vol. 13, No. 310.

Burg et al., CH-Zeitschrift, Technische Rundschau No. 47, Nov. 1977, pp. 25, 27 and 29.

*Primary Examiner*—Richard M. Lorence
*Assistant Examiner*—David M. Fenstermacher
*Attorney, Agent, or Firm*—Sughrue,Mion,Zinn,Macpeak & Seas, PLLC

[57] ABSTRACT

In a linear motion machine in which a number of rolling elements 8 are interposed between a linearly extending guide shaft 1 and a moving body 2 linearly moved while being guided by the guide shaft 1, and the elements 8 circulate along element rolling grooves 5 in the moving body 2 while rolling within the grooves 5, a lubricant supply member 14 made of lubricant-contained polymer is located near a load-receiving areal part of the element rolling grooves 5. The lubricant is oozed out of the lubricant supply member 14 and automatically supplied to the element rolling grooves 5 and the elements 8. A stable lubrication of the machine is ensured for a long time.

14 Claims, 12 Drawing Sheets

LINEAR MOTION MACHINE WITH A LUBRICANT SUPPLY MEMBER

BACKGROUND OF THE INVENTION

1. Field of the Invention

The present invention relates to a linear motion machine, such as a linear guide machine, a ball screw-nut machine, or a ball spline machine. More particularly, the invention relates to a linear motion machine with a lubricant supply member which is capable of automatically supplying lubricant stably for a long time to a number of elements rolling within a moving body as one of the components constituting the linear motion machine.

2. Related Art

A family of drive machines including typically a ball screw-nut machine for linearly driving a machine table, a family of guide machines including typically a linear guide machine for supporting a machine table, for example, and an X-Y table belonging to the combination of these families, and the like are known for linear motion machines usually used. Any of these machines is constructed such that a number of rolling elements are interposed between a linearly extending guide shaft and a moving body linearly moved while being guided by the guide shaft, and the elements circulate along element rolling grooves formed in the moving body while rolling within the element rolling grooves. With this structure, the moving body runs smoothly and stably.

A conventional linear guide machine includes an axially extending guide rail 1 with rolling-body rolling grooves 3 on the outer sides, and a slider 2 assembled astride the guide rail 1 as shown in FIGS. 1 and 2. The slider 2 includes a slider proper 2A and end caps 2B applied to both ends of the slider proper. Element rolling grooves 5 are formed on the inner sides of legs 4 of the slider proper at locations thereof facing the grooves 3 of the guide rail 1. Further, element return paths 6 pass through the thick portions of the legs 4. Each of the caps 2B includes curved paths 7 respectively connecting the element rolling grooves 5 of the slider proper 2A to the return paths 6 extending in parallel with the element rolling grooves 5. The element rolling grooves 5, the return paths 6, and the curved paths 7 formed at both ends thereof cooperate to form element circulating paths. The circulating paths are filled with a number of balls 8 as rolling elements. Within the element rolling grooves 5 of the slider 2, the elements 8 are held by wire retainers H so as not to retain them in the groove.

The slider 2 loaded with the elements 8 is assembled to the guide rail 1, as shown in FIG. 3. In the assembled structure, a gap 15 is present between the outer surface of the guide rail 1 and the inner surface of the slider 2. The slider 2 thus assembled to the guide rail 1 smoothly moves along the guide rail 1 with the aid of the element rolling motion of the elements 8 within the space defined by the combined confronting grooves 3 and 5.

Side seals 9 are attached to both ends of the slider 2, and under seals 10 are attached to the under side of the slider 2, for the purpose of preventing off dust from entering into the slider (only one seal is illustrated for these side and under seals).

Lubricant, such as grease or lubricating oil, is fed to the slider 2, through grease nipple G attached to a lubricant supply port 11 of the end cap 2B. Lubricant L passes through an oil path 12 formed on the rear side of the cap 2B and a hole of a return guide 13, and enters the curved paths 7 and attaches to the elements 8 moves along the paths by turning over and over. The lubricant L, attached to the elements 8, is introduced into the element rolling grooves 5 with the movement of the elements. Thereafter, the lubricant flows out of the slider through gaps related to the side seals 9 and the under seals 10. A direct lubricant supply method in which lubricating oil or grease as lubricant is directly supplied to the slider, from the grease nipple G of the slider 2, is employed for the conventional linear guide machine. Because of this, the machine has the following problems to be solved.

(1) When the pipes for supplying lubricating oil are clogged, the lubricant is not fed to the element rolling grooves. Under this condition, abnormal wear takes place in the machine. The machine fatigues and its lifetime is shortened.

(2) The lubricant flows in the direction in which the gravity acts. To flow the lubricant in the anti-gravity direction, pressure is required. This makes it difficult to design the lubricant supply circuit. If the lubricant leaks from a gap, the pressure cannot be increased and the lubricant flow in the anti-gravity direction stops. Consequently, the supply of the lubricant to the elements fails.

(3) No means to check whether or not the amount of lubricant necessary for the elements is supplied, is provided. This creates the following problem. When the machine is used in a clean room, an excessive supply of the lubricant causes dust. An insufficient supply of the lubricant causes an abnormal wear in the machine. The lifetime of the machine is shortened.

(4) Lubricant must be periodically supplied to the slider in order to keep the amount of the lubricant initially supplied. Provision of an additional automatic oil supply system increases the cost. If the oil supply system is not provided, the linear guide machine and the main machine using it as well must be stopped periodically for lubrication. The productivity of the main machine is deteriorated.

In the conventional popular ball screw-nut machine, a ball screw-nut having a spiral thread on the inner surface thereof is fit to a shaft with a spiral thread on the outer surface thereof, with a number of balls interposed therebetween. When the ball screw machine operates, the balls move by turning along a spiral space defined by the thread of the screw shaft and the thread of the nut that confronts the former. The balls pass through the ball circulating path and run through the spiral space, and return to the original position. In this way, the balls circulate. Through such a spiral, circulating motion of the balls, the screw shaft linearly moves relative to the nut. Ball circulating tubes, ball circulation dies, and the like may be enumerated for the means for forming the circulating path.

To secure a smooth circulating motion of the balls, the inner side of the ball screw-nut is coated or filled with lubricant, such as grease or lubricating oil, before assembly. Or the lubricant is supplied to the ball screw-nut by an oil supply system.

The ball screw-nut employing the oil or grease lubricating method has the following problems on the lubricating technique.

(1) Where the lubricating oil is used, a periodical supply of the oil is required so that an oil film is always formed in the screw threads where the balls roll. Therefore, the expensive oil supply system and a pipe line circuit associated therewith must be used.

(2) The oil supply system/pipe line circuit must be inspected so as to secure a prescribed supply of the lubricating oil. This results in complicated maintenance work.

(3) Where the lubricating oil is used, the amount of the supplied oil must be optimized. If an excessive amount of the lubricating oil is supplied to the ball screw-nut machine used in connection with a machine tool, such as a lathe, the leaked lubricating oil mixes with the cutting oil, so that the working ability of the machine tool is deteriorated. If the amount of the lubricating oil is greatly insufficient, the ball screw shaft is abnormally worn, so that the peel-off life is shortened.

(4) Where grease is used, the grease filling space of the ball screw is large and the sealing of the space is imperfect. Accordingly, the filled grease easily dissipates and is deteriorated by its oxidization.

(5) It is difficult to insure that a necessary amount of grease is applied to only necessary screw thread parts. Accordingly, the grease applied is frequently improper in its amount. If an excessive amount of grease is applied, the excessive grease becomes fine particles. These grease particles are scattered to outside the ball screw-nut machine, to contaminate the clean space of the clean room.

SUMMARY OF THE INVENTION

In view of the problems accompanying the conventional linear motion machine as mentioned above, it is an object of the present invention to provide a maintenance free and long life linear motion machine which automatically and stably supplies an optimum amount of lubricant to the rolling elements in the moving body of the linear motion machine, for a long time.

Another object of the present invention is to provide a maintenance-free, dust-free and long life ball screw-nut machine capable of automatically and stably supplying an optimum amount of lubricant to the rolling elements in the moving body of the linear motion machine for a long time.

According to an aspect of the present invention, there is provided a linear motion machine in which a number of rolling elements are interposed between a linearly extending guide shaft and a moving body linearly moved while being guided by the guide shaft, and the elements circulate along element rolling grooves formed in the moving body while rolling within the grooves, wherein a lubricant supply member made of lubricant-contained polymer is located near a load-receiving areal part of the element rolling grooves.

According to another aspect of the present invention, there is provided a linear guide machine with a lubricant reservoir including an axially extending guide rail with element rolling grooves on the outer surface thereof, a slider, assembled to the guide rail, having load element rolling grooves to be opposed to the element rolling grooves and return paths coupled through curved paths with both ends of the load element rolling grooves, and a number of rolling elements retained in the load element rolling grooves of the slider so as to be circulated through the curved paths and the return paths, wherein a lubricant reservoir made of lubricant-contained polymer is located in a gap between the guide rail and the slider.

According to yet another aspect of the present invention, there is provided a ball screw-nut machine having a screw shaft with a spiral thread on the outer surface thereof, a ball screw-nut to be screwed to the screw shaft, the ball screw-nut having on the inner surface thereof a spiral thread to be opposed to the spiral thread of the screw shaft, and a number of balls circulating through ball circulating paths formed in the ball screw-nut while rolling in spiral load element rolling grooves each defined by both the screw threads, wherein a lubricant supply member made of lubricant-contained polymer is provided in a spiral ball block space in the ball screw-nut.

With such a construction, lubricant is oozed out of lubricant-contained polymer located on no-load-receiving areal part of each element rolling groove in which the elements interposed between the guide shaft and the moving body move by turning over and over, and is stably and uniformly supplied to the rolling elements for a long time. Due to temperature rise and pressured caused by the rolling of the elements, lubricant oozes out of the lubricant supply member. The oozed lubricant comes in contact with and attaches to the rolling elements, and reaches the surface of the element rolling grooves. As a result, an oil film is formed thereon. There is no need to provide the lubricant flowing circuit, or to use pressure to cause the lubricant to flow in the anti-gravity direction. An optimum amount of lubricant is naturally supplied to the related parts and portions.

In the ball screw-nut machine with the lubricant supply member, lubricant is oozed from the lubricant supply member made of lubricant-contained polymer, and uniformly spreads over the thread faces of the screw shaft. A stable lubricant supply is secured for a long time.

DETAILED DESCRIPTION OF THE PREFERRED EMBODIMENTS

Figure 1:
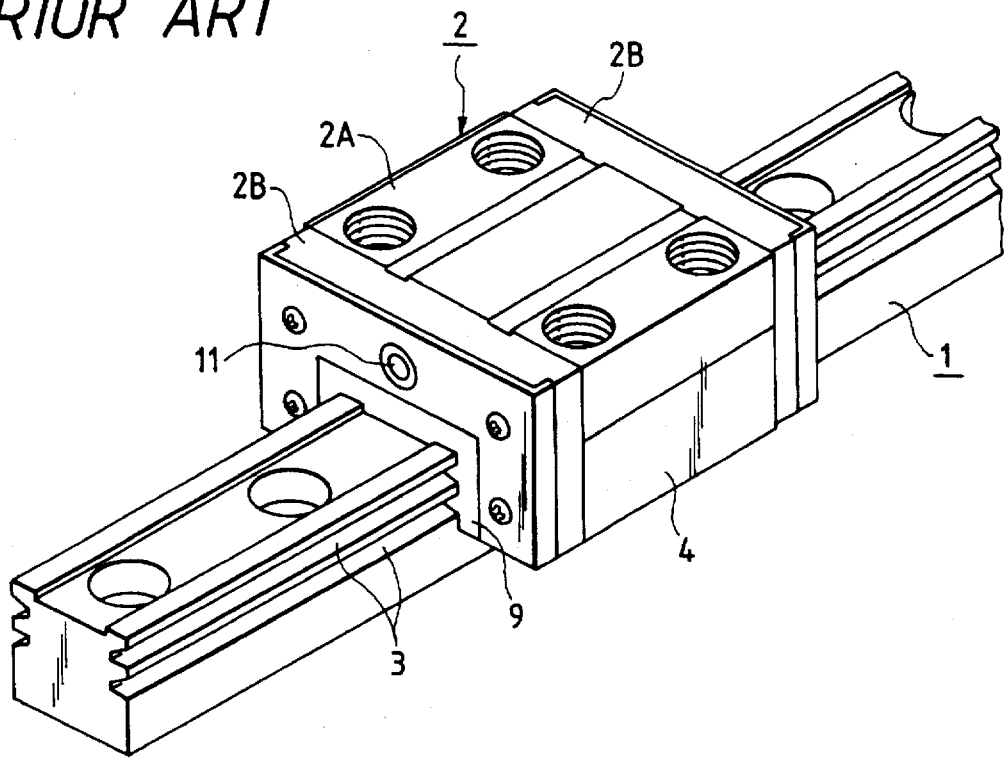
FIG. 1 is a perspective view showing a conventional overall linear guide machine.
Figure 3:
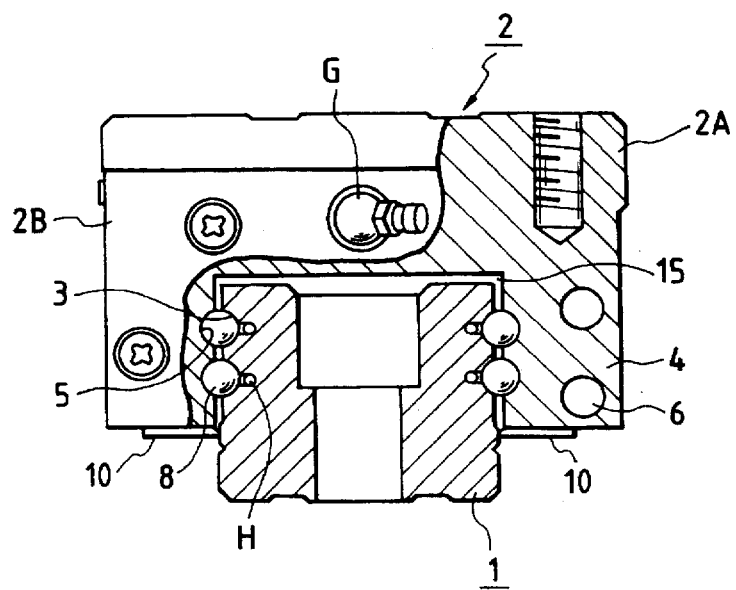
FIG. 3 is a front view, partly cut out, of the linear guide machine of FIG. 1.
Figure 2:
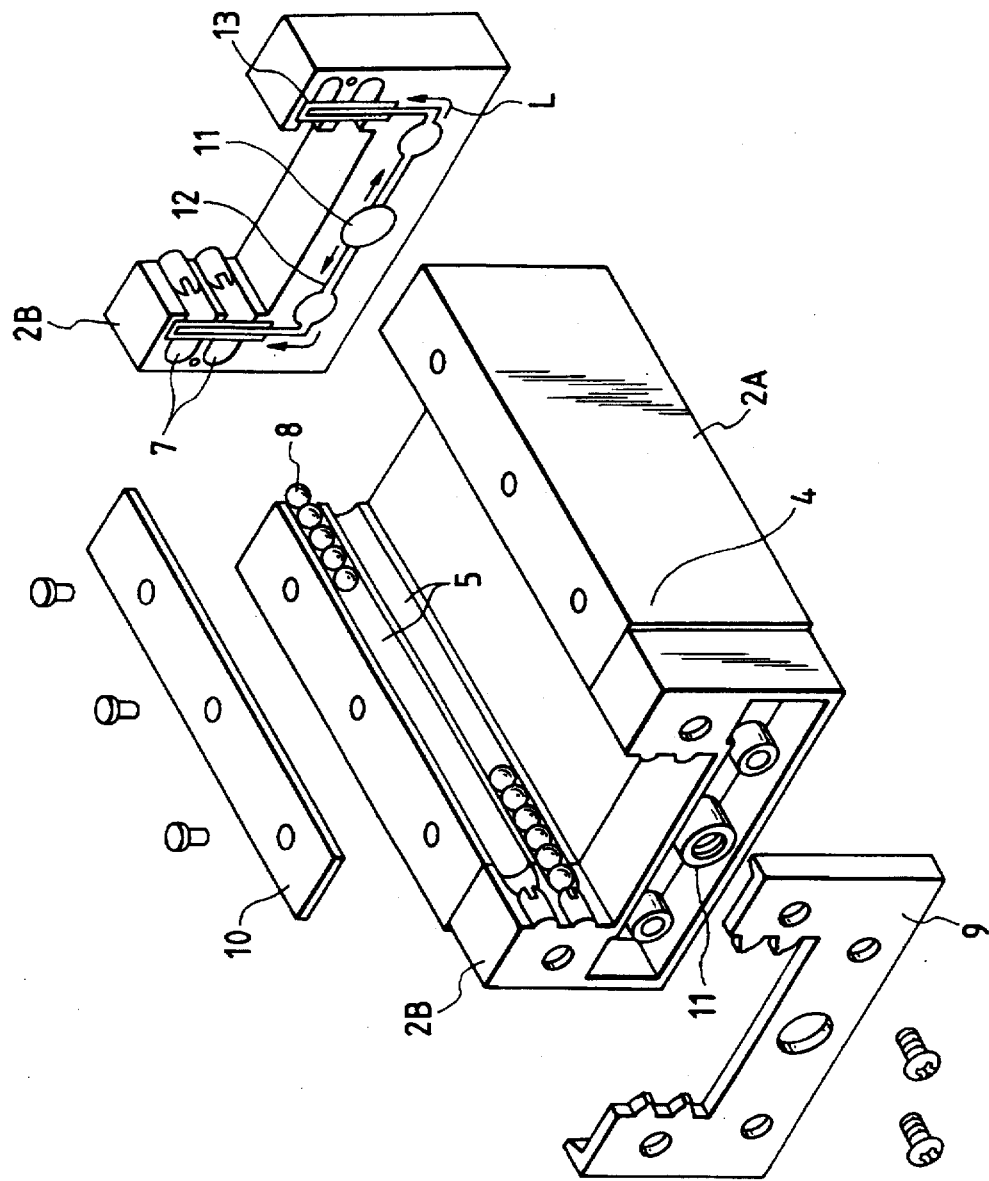
FIG. 2 is an exploded view showing the linear guide machine, a slider of the apparatus being illustrated upside down.

A first embodiment of the present invention will be described with reference to FIGS. 3 and 4. In these figures, like or equivalent portions are designated by like reference numerals in FIGS. 1 and 2, used for description of the conventional machine.

Figure 4:
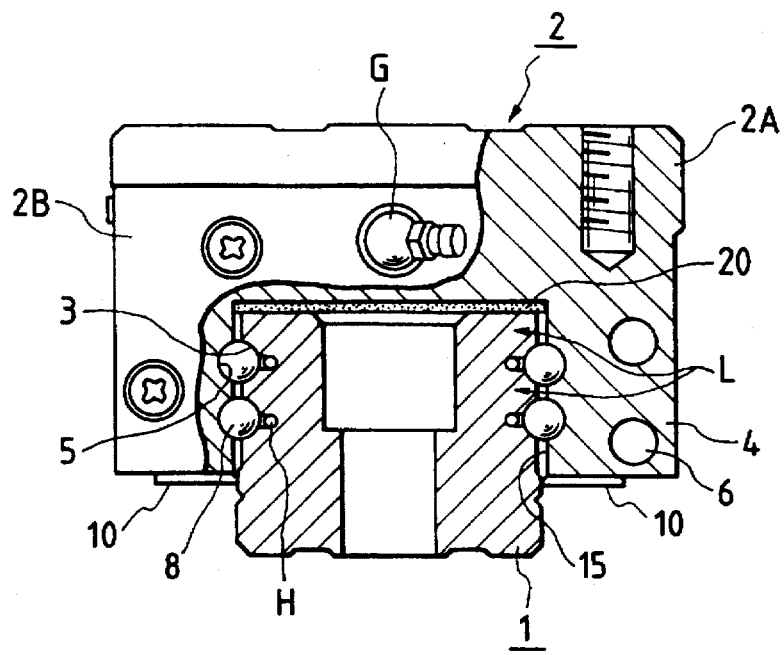
FIG. 4 is a front view, partly cut out, of a linear guide machine according to a first embodiment of the present invention.
Figure 5:
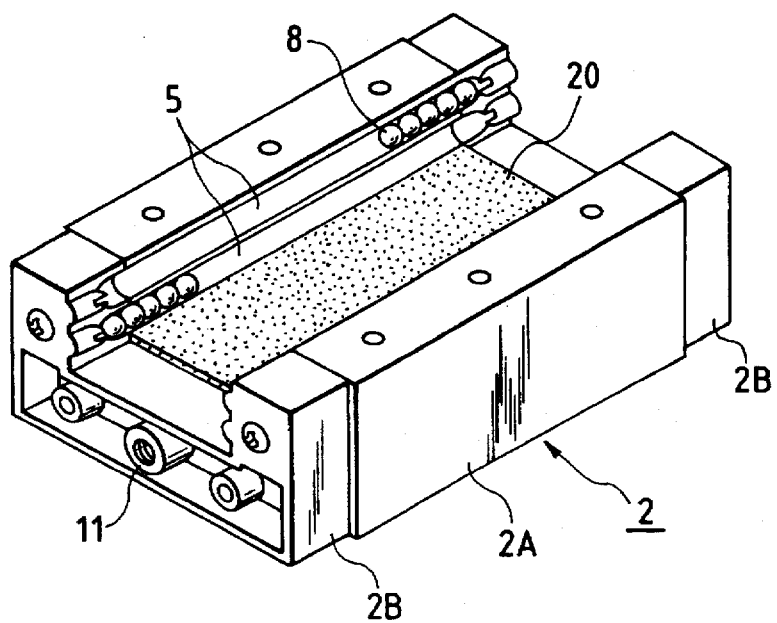
FIG. 5 is a perspective view showing a slider of the linear guide machine of FIG. 4, the slider being illustrated upside down.

In FIGS. 4 and 5 showing the first embodiment of the present invention, a lubricant reservoir 20 is located in a gap between the upper surface of the guide rail 1 and the inner surface of the slider 2. The lubricant reservoir 20 consists of a lubricant-contained polymer member. To form the lubricant-contained polymer member, paraffin hydrocarbon oil of 80 weight % as lubricant is mixed into polyethylene containing low molecular weight polyethylene of 14 weight % (molecular weight:$1\times10^3$ to $5\times10^5$) and ultra-high molecular weight polyethylene of 6 weight % (molecular weight:$1\times10^6$ to $5\times10^6$). The resultant mixture is heated and molten. The molten mixture is injected into a mold, and cooled and solidified under a pressure. The lubricant-contained polymer member thus formed has the same size of the top surface of the concavity of the slider proper 2A.

The lubricant-contained polymer member as the lubricant reservoir 20, as shown in FIG. 5, is firmly attached to the entire top surface of the slider proper 2A. Welding, screws or the like may be used for the fastening means.

The operation of the linear guide machine thus constructed will be described.

When the slider 2 moves along the guide rail 1 firmly attached to the machine table, the elements 8 move in the moving direction of the slider 2 at a lower speed than the slider moving speed, while rolling in the load element rolling path defined by the element rolling grooves 3 and the load element rolling grooves 5. The elements 8 are turned back by the curved paths 7 at one end of the slider proper, and travel in the reverse direction along the return paths 6. The elements 8 are turned back again by the curved paths 7 at the other end of the slider proper and travel again in the load element rolling path. In this way, the elements 8 circulate.

When the linear guide machine is thus operated, the lubricant reservoir 20 fastened to the slider 2 receives the pressure from the upper surface of the guide rail 1 and rubs on the rail surface to be heated. The lubricant contained in the lubricant-contained polymer member is fluidified, and the lubricant L is gradually oozed out of the lubricant reservoir 20 and flows out along the side walls of the guide rail 1. As a result, the lubricant is automatically supplied to the elements 8 rolling in the grooves 3. Thus, the lubricant is stably supplied to the elements 8 for a long time. Accordingly, the linear guide machine well runs at a low torque without the need for periodic supply of the lubricant to the slider 2 from outside.

The lubricant-contained polymer member as the lubricant reservoir 20 does not necessarily contact upper surface of the guide rail 1. If the lubricant reservoir is not in contact with the upper surface of the guide rail, heat is generated when the elements 8 roll in the load element rolling path defined by the grooves 3 and 5, and is transferred to the slider 2. Thus, temperature of the lubricant reservoir 20 rises and the lubricant is fluidified and oozed therefrom. Accordingly, the lubricating function as mentioned above is secured.

The lubricant reservoir 20 is located in close proximity to the elements 8 in the load element rolling path. Therefore, the lubricant naturally flows to reach the elements 8 in the load element rolling path if the lubricant supply circuitry is not formed in the slider. For this reason, there is no need of the complicated lubricant supply circuitry, which is essentially provided in the caps of the conventional slider. Accordingly, the machine construction is simplified.

The amount of oil contained in the lubricant reservoir 20 may be determined by properly selecting the content of the lubricant in the lubricant-contained polymer member. Because of this, the minimum amount of the lubricant may be supplied to the elements 8 rolling in the load element rolling path. Accordingly, the problems of the conventional linear guide machine, which arise from the supply of an improper amount of the lubricant to the slider, e.g., the dust generation caused by the excessive lubricant supply and the abnormal wear by the insufficient lubricant supply, are successfully solved. The linear guide machine of the first embodiment may be used in a clean room.

Further, a maintenance free device is realized. The automatic oil supply system for the periodical supply of oil becomes unnecessary, and the cost of provision and operation of the oil supply system is eliminated. The productivity reduction caused when the machine is stopped for the periodical supply of oil is also avoided.

Figure 6:
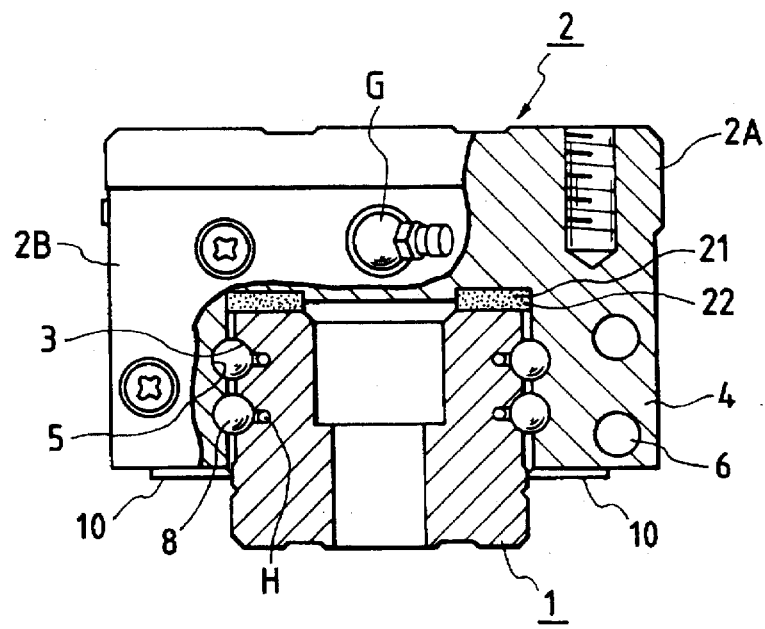
FIG. 6 is a front view, partly cut out, of a linear guide machine according to a second embodiment of the present invention.
Figure 7:
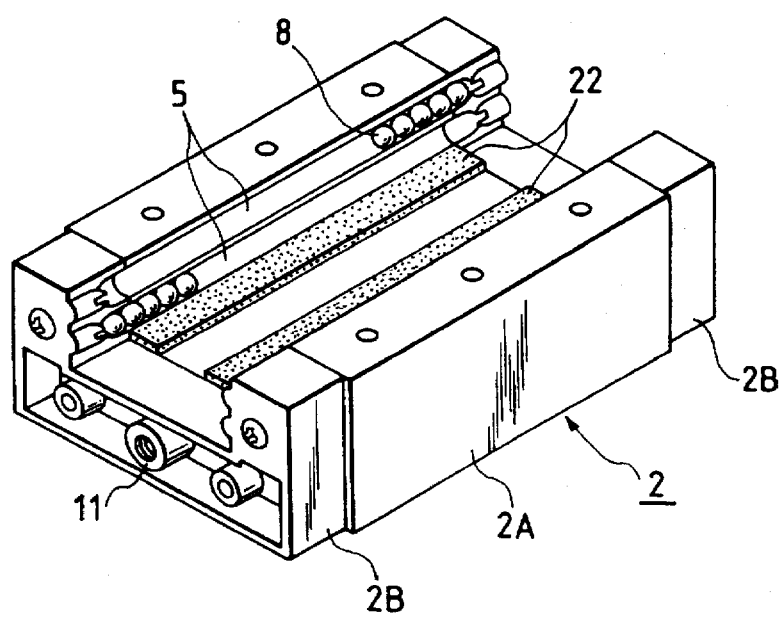
FIG. 7 is a perspective view showing a slider of the linear guide machine of FIG. 6, the slider being illustrated upside down.

A second embodiment of a linear guide machine according to the present invention is illustrated in FIGS. 6 and 7.

In the second embodiment, shallow grooves 21, axially extended, are formed on both sides of the top surface of the concavity of the slider proper 2A. Lubricant reservoirs 22 consisting of lubricant-contained polymer members, shaped like plates, are placed in the shallow grooves 21, respectively. The operation and the useful effects of the second embodiment are comparable with those of the first embodiment.

Figure 8:
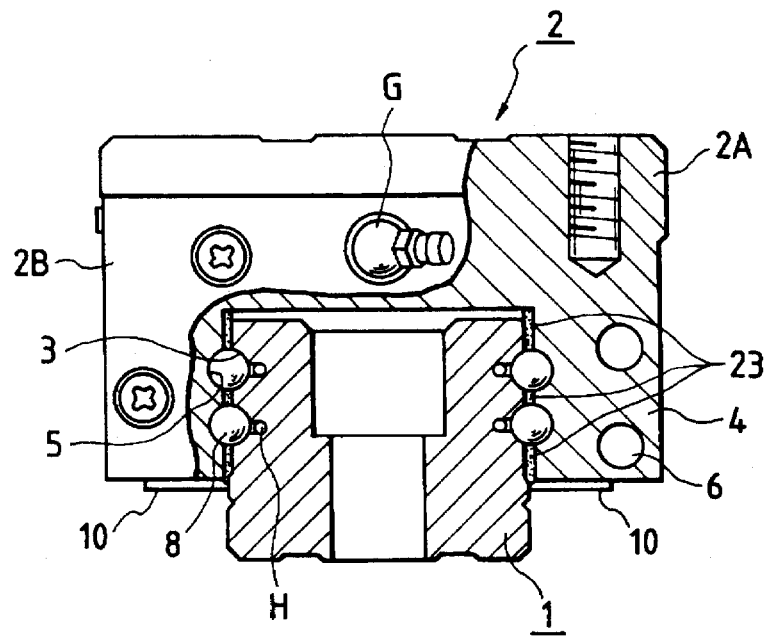
FIG. 8 is a front view, partly cut out, of a linear guide machine according to a third embodiment of the present invention.
Figure 9:
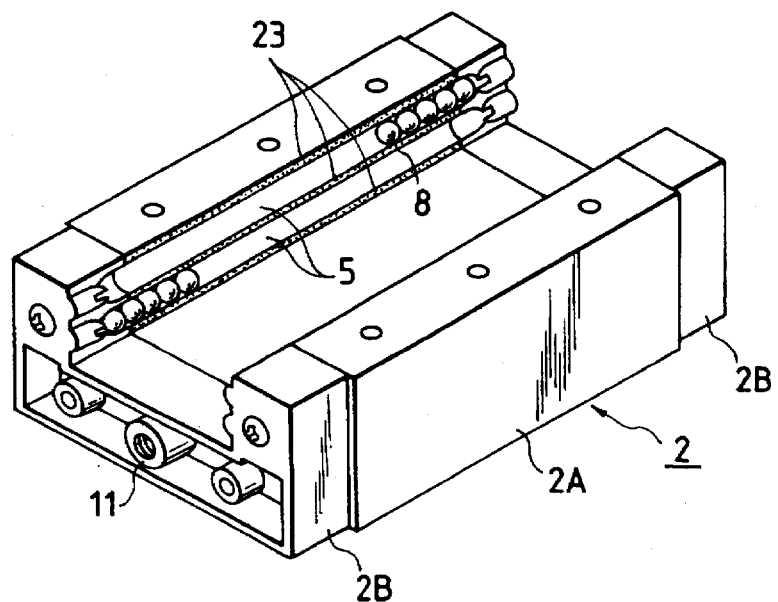
FIG. 9 is a perspective view showing a slider of the linear guide machine of FIG. 8, the slider being illustrated upside down.

A third embodiment of a linear guide machine according to the present invention is illustrated in FIGS. 8 and 9.

In the third embodiment, lubricant reservoirs 23 consisting of lubricant-contained polymer members, shaped like narrow strips, are fastened to the top edges of the element rolling grooves 5 on both sides of the concavity of the slider proper 2A. The lubricant reservoirs 23 frictionally contact with the side faces of the guide rail 1 and the elements 8 to be heated. By the heat, the lubricant is fluidified and exuded from the lubricant-contained polymer members. In addition to the useful effects similar to those of the first embodiment, the third embodiment has the following useful effect. If the linear guide machine is used in a state that the linear guide machine illustrated in FIG. 4 is turned upside down, the lubricant exuded from the lubricant reservoirs 23 naturally reach incoming elements without any pressure. Therefore, the linear guide machine may be attached to a main machine in any direction without consideration of the flow of the lubricant.

Also in the third embodiment, the lubricant reservoirs 23 do not necessarily contact with the side faces of the guide rail 1 and the elements 8.

Figure 10:
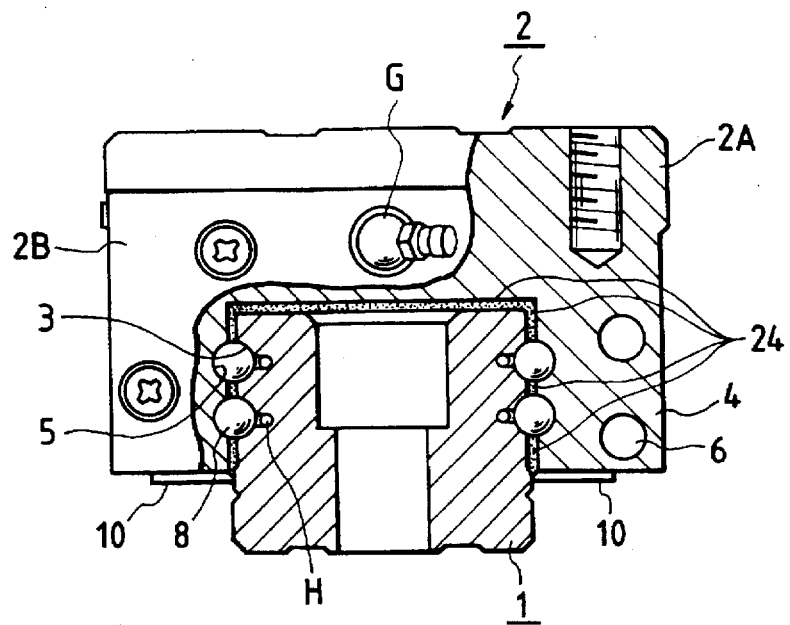
FIG. 10 is a front view, partly cut out, of a linear guide machine according to a fourth embodiment of the present invention.
Figure 11:
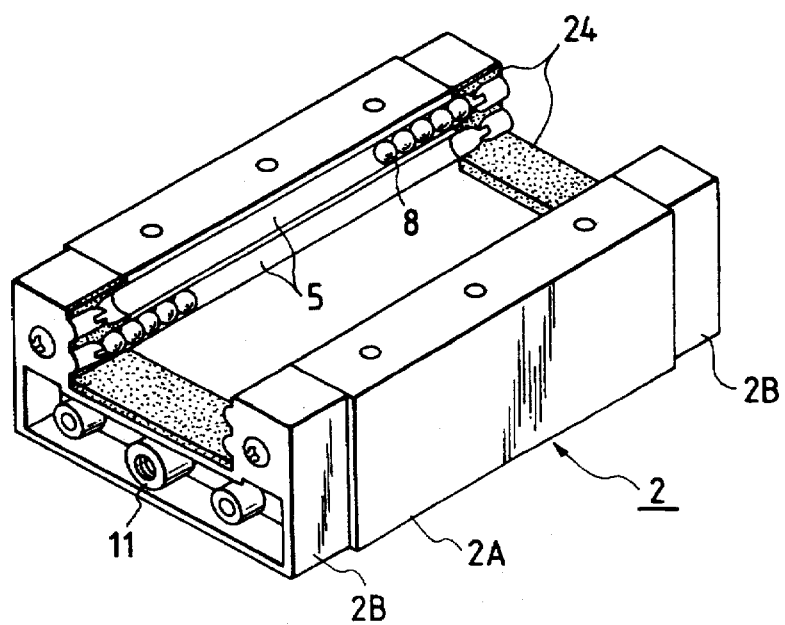
FIG. 11 is a perspective view showing a slider of the linear guide machine of FIG. 10, the slider being illustrated upside down.

A fourth embodiment of a linear guide machine according to the present invention is illustrated in FIGS. 10 and 11.

In the fourth embodiment, lubricant reservoirs 24 consisting of lubricant-contained polymer members are fastened to the flat areas of the caps 2B, located at both ends of the slider proper 2A, where face the guide rail 1. The operation and the useful effects of the fourth embodiment are comparable with those of the third embodiment.

The linear guide machine of each of the first to fourth embodiments, which employs the lubricant-contained polymer members for the lubricant supply, may be modified as follows. A grease nipple G is attached to the lubricant supply port 11 formed in the slider 2. Lubricant is fed from the grease nipple G into the internal space between the guide rail 1 and the slider 2. The modification employing both the lubricant supply method using the lubricant reservoir and the direct lubricant supply method for the lubricant supply has the following fail-safe effect. If the lubricant supply pipe is clogged, the lubricant supply is continued since the lubricant reservoir 20 normally operates to supply lubricant. Accordingly, the thus modified linear guide machine is free from the trouble by the clogging of the oil pipe, such as the abnormal wear and the shortening of the machine life.

The lubricant-contained polymer member for the lubricant reservoir used for the linear guide machine is made of synthetic resin previously impregnated with lubricant. The compositions and the forming method of the lubricant-contained polymer member, which are believed to be preferable, will be described.

Lubricant, which is selected from among paraffinic hydrocarbon oil, such as poly-α olefin polymer, naphthene hydrocarbon oil, mineral oil, ether oil, such as dialkyl diphenyl ether oil, ester oil, such as phthalate ester trimellitic acid ester, is mixed into a polymer selected from among a group of poly-α olefin polymers of substantially the same basic chemical structure, such as polyethylene, polypropylene, polybutylene, and polymethylpentene. The resultant mixture is molten by heat and injected into a given mold under pressure, and cooled and solidified. If required, additives, such as an anti-oxidant, a rust preventive agent wear preventive, agent unfoaming agent, and a high-pressure agent, may be previously added.

The group of the polymers have the same basic chemical structures, but the average molecular weights are in the range of $1 \times 10^3$ to $5 \times 10^6$. Of those polymers, the polymer of a relatively low molecular weight of $1 \times 10^3$ to $1 \times 10^6$ and/or the polymer of an ultra-high molecular weight of $1 \times 10^6$ to $5 \times 10^6$ is used as occasion demands.

To increase a mechanical strength of the lubricant-contained polymer member, thermoplastic resin or thermoset resin as listed below may be added to the poly-α olefin polymer.

The thermoplastic resins available for the lubricant-contained polymer member of the invention are: polyamide, polycarbonate, polybutylene terephtalate, polyphenylene sulfide, polyether sulphon, polyether ether ketone, polyamide imide, polystyrene, ABS resin, and the like.

The thermoset resins available for the lubricant-contained polymer member are unsaturated polyester resin, urea resin, melamine resin, phenolic resin, polyimide resin, epoxy resin, and the like.

One of these resins or the combination of them may be used.

If necessary, a proper amount of compatibilizing agent may be added in order to disperse the poly-α olefin polymers and other resins more uniformly.

Figure 12:
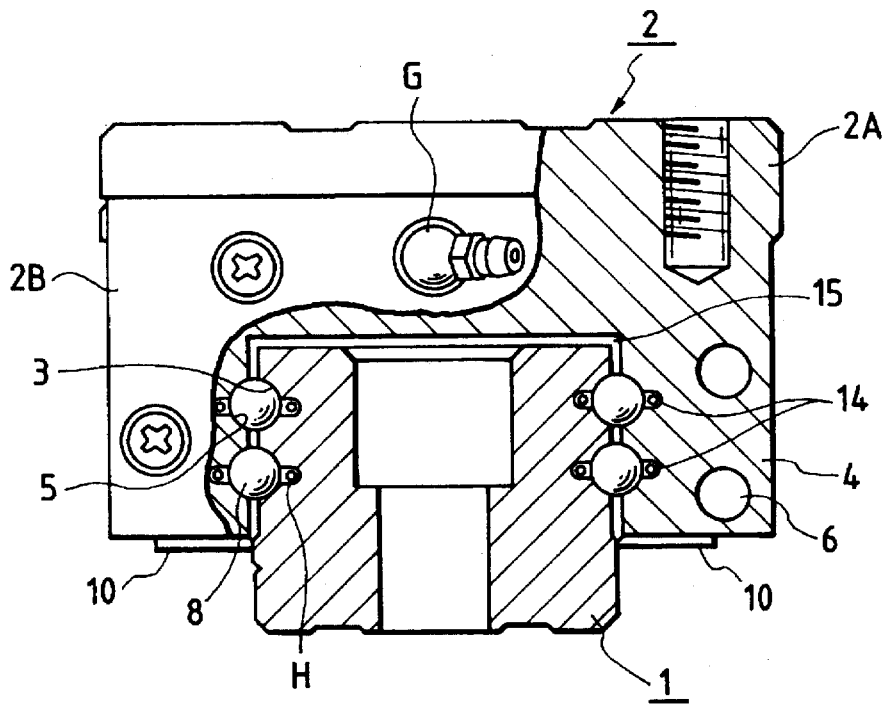
FIG. 12 is a front view, partly cut out, of a linear guide machine according to a fifth embodiment of the present invention.
Figure 13:
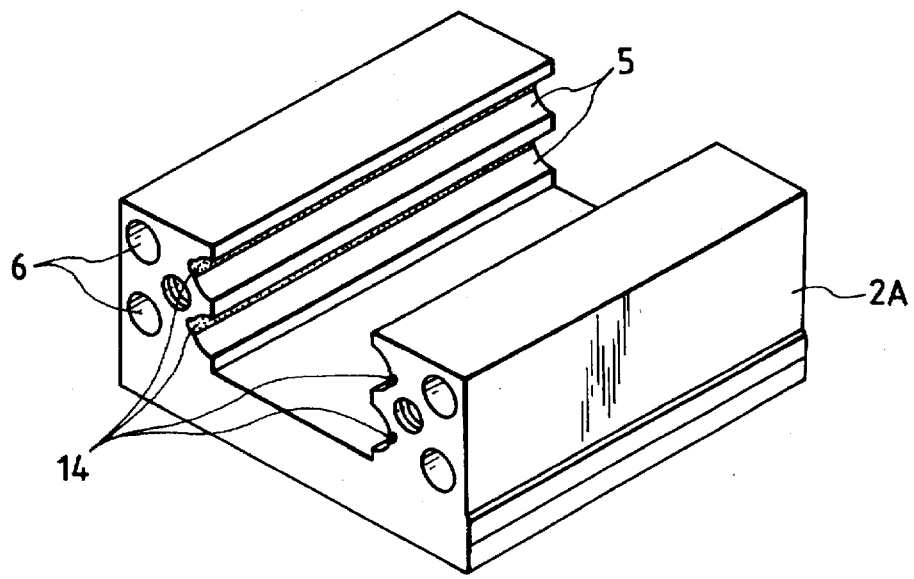
FIG. 13 is a perspective view showing a slider of the linear guide machine of FIG. 12, the slider being illustrated upside down.

A fifth embodiment of the present invention will be described with reference to FIGS. 12 to 14. In these figures, like or equivalent portions are designated by like reference numerals in FIGS. 1 and 2, used for description of the conventional art.

The fifth embodiment of the invention is a linear guide machine.

The linear guide machine of the instant embodiment may be constructed such that a grease nipple G is attached to the lubricant supply port 11 formed in the slider 2, and lubricant is fed from the grease nipple G into the internal space between the guide rail 1 and the slider 2. However, it is not always necessary to construct the machine for the lubricant supply since the instant embodiment uses an automatic lubricant supply mechanism to be described below.

Figure 14:
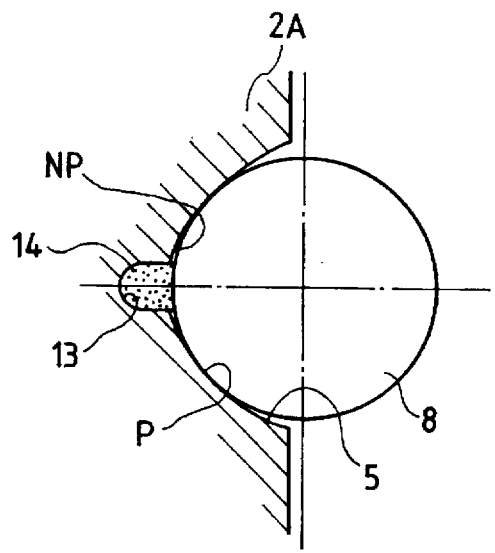
FIG. 14 is an enlarged cross sectional view showing an element rolling groove of the slider used in the linear guide machine of FIG. 12.

The surface of each of the element rolling grooves 5, as shown in FIG. 14, includes a part P which receives a load when it contacts with the elements 8, and another part NP which receives no load when it contacts with the elements. In this embodiment, a small groove 13 is formed in the bottom of the groove. The groove 13 is smaller than the element rolling groove 5. A lubricant supply member 14 as lubricant-contained polymer is fastened to the small groove 13. Welding, fitting or the like may be used for the fastening means.

The lubricant-contained polymer of the lubricant supply member used for the linear motion machine may be made of the materials as already described.

The operation of the linear motion bearing thus constructed will be described.

When the slider 2 moves along the guide rail 1 firmly attached to the machine table, the elements 8 move in the moving direction of the slider 2 at a lower speed than the slider moving speed, while roll in the load element rolling path defined by the element rolling grooves 3 and the load element rolling grooves 5. The elements 8 are turned back by the curved paths at one end of the slider proper, and travel in the reverse direction along the return paths 6. The elements 8 are turned back again by the curved paths at the other end of the slider proper and travel again in the load element rolling path. In this way, the elements 8 circulate.

When the linear guide machine is thus operated, the elements 8 roll in the element rolling grooves 5 of the slider 2 while contacting with the lubricant supply member 14 fastened to the small groove 13. The lubricant supply member 14 receives a pressure and the temperature thereof rises. The lubricant contained in the lubricant-contained polymer is fluidized, and the lubricant is gradually oozed from the lubricant supply member 14 and attaches to the surface of the elements 8. Accordingly, a proper amount of the lubricant is uniformly supplied to the elements. The inertia of the slider 2 is applied to the lubricant supply member 14 when the slider is accelerated or decelerated. In this case, the lubricant tends to be oozed from the lubricant-contained polymer member.

Thus, the lubricant is automatically supplied to the load-receiving part P where the elements 8 are in contact with the element rolling groove 5. Accordingly, the linear guide machine well runs at a low torque without the periodical supply of the lubricant to the slider 2 from outside.

The lubricant reservoir 20 is in contact with the elements 8 in the load element rolling path. Therefore, the lubricant naturally flows to reach the elements 8 in the load element rolling path even if the lubricant supply circuitry is not formed in the slider. For this reason, there is no need of the complicated lubricant supply circuitry, which is provided in the caps of the conventional slider. Accordingly, the machine construction is simplified.

If the linear guide machine is used in a state that the linear guide machine is turned upside down, the lubricant oozed from the lubricant supply member 14 is supplied to the elements 8 in a similar way, without any pressure. Therefore, the linear guide machine may be attached to a main machine in any direction without consideration of the flow of the lubricant. The amount of oil contained in the lubricant supply member 14 may be determined by properly selecting the content of the lubricant in the lubricant-contained polymer member. Because of this, the minimum amount of the lubricant may be supplied to the elements 8 rolling in the load element rolling path. Accordingly, the problems of the conventional linear guide machine, which arise from the supply of an improper amount of the lubricant to the slider, e.g., the dust generation caused by the excessive lubricant supply and the abnormal wear by the insufficient lubricant supply, are successfully solved. The linear guide machine of the first embodiment may be used in a clean room.

Further, a maintenance free device is realized. The automatic oil supply system for the periodical supply of oil becomes unnecessary, and the cost of provision and operation of the oil supply system is avoided. The productivity reduction problem caused when the machine is stopped for the periodical supply of oil also is avoided.

Figure 15:
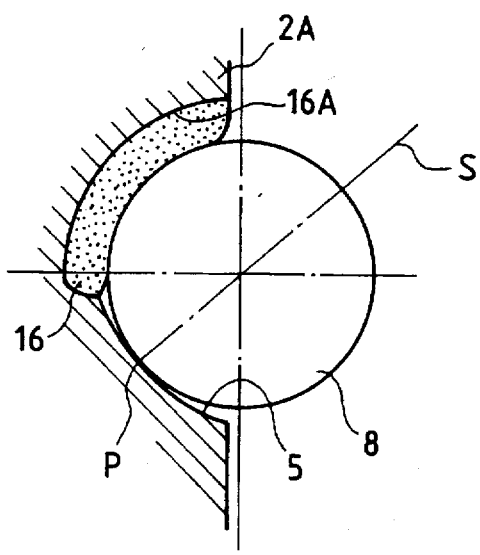
FIG. 15 is an enlarged cross sectional view showing an element rolling groove of a slider used in the linear guide machine according to a sixth embodiment of the present invention.

FIG. 15 is an enlarged cross sectional view showing an element rolling groove of a slider used in the linear guide machine according to a sixth embodiment of the present invention.

In a linear guide machine constructed so as to apply a preparatory pressure by deviating the pitch of the upper and lower element rolling grooves 3 and 3 of the guide rail from that of the upper and lower element rolling grooves 5 and 5, one of the flank faces of each element rolling groove comes in contact with the elements 8 (these contact with each other in the direction of the load action line S, for example). In this embodiment, a groove 16A is formed over the entire no-load-receiving part NP of the element rolling groove 5, while the small groove 13 is formed in the bottom of the element rolling groove 5 in the fifth embodiment. A lubricant supply member 16 consisting of lubricant-contained polymer, which is sized so as to fill the groove 16A, is fastened to the groove 16A.

In this embodiment, the area for receiving the lubricant supply member may be large. Accordingly, an increased amount of lubricant may be supplied to the lubricant supply member 16. The operation of this embodiment is substantially the same as that of the fifth embodiment. However, a longer lifetime of the machine than that of the machine of the sixth embodiment is secured.

Figure 16:
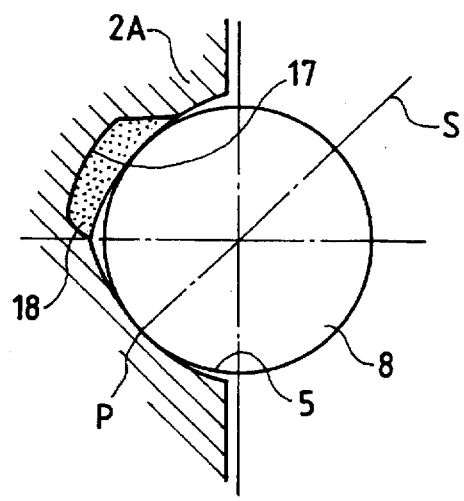
FIG. 16 is an enlarged cross sectional view showing an element rolling groove of a slider used in the linear guide machine according to a seventh embodiment of the present invention.

FIG. 16 is a seventh embodiment of the present invention, which may be considered as a modification of the sixth embodiment.

In this embodiment, a groove 17 is formed in each of the element rolling grooves 5. The size of the groove 17 is substantially the half of the no-load-receiving part A lubricant supply member 18 consisting of lubricant-contained polymer, which is sized so as to fill the groove 17, is fastened to the groove 17. The lubricant supply member may retain the amount of the lubricant between the amounts of the lubricant contained in the lubricant supply member 14 of the fifth embodiment and the lubricant supply member 16 of the sixth embodiment. The operation and the useful effects of this embodiment are comparable with those of the sixth embodiment.

Figure 17:
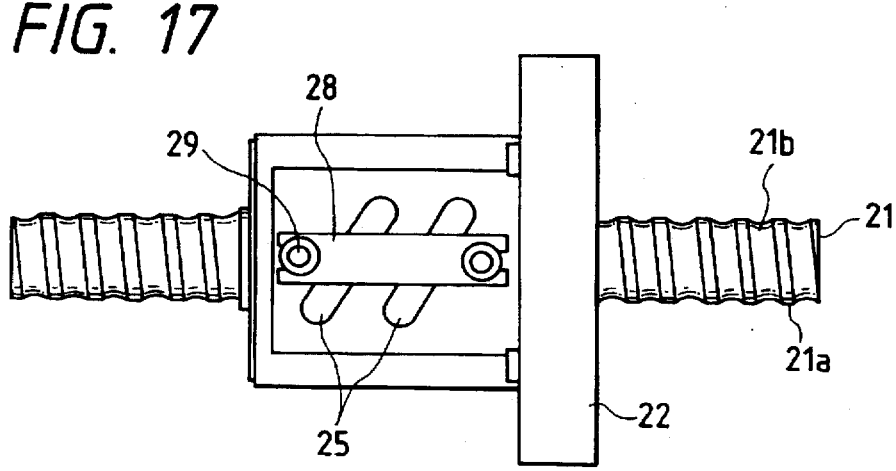
FIG. 17 is a plan view showing a ball screw-nut machine according to an eighth embodiment of the present invention.
Figure 18:
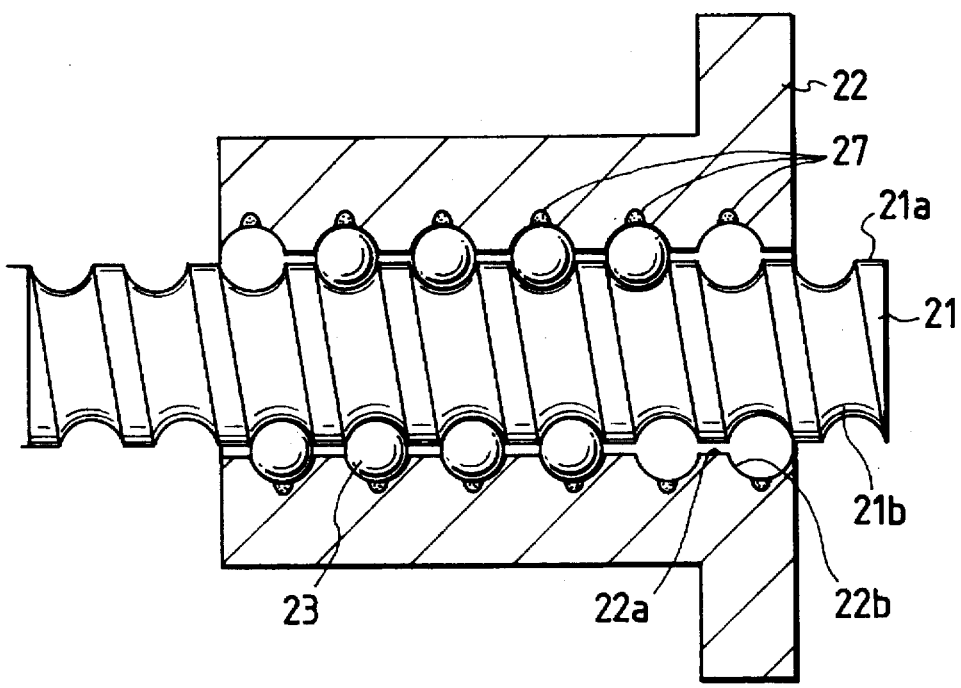
FIG. 18 is a longitudinal sectional view showing the ball screw-nut machine of FIG. 17.

FIGS. 17 and 18 show an eighth embodiment of the present invention, which is a ball screw-nut machine as a typical machine of the drive type linear motion machine.

A ball screw-nut 22 as a moving body is screwed to a screw shaft 21 as a guide shaft. A spiral thread 21b is formed on the outer surface 21a of the screw shaft 21, linearly extended. A spiral thread 22b as an element rolling groove, which corresponds to the spiral thread 21b of the screw shaft 21, is formed on the inner surface 22a of the ball screw-nut 22. A number of balls 23 are interposed between the screw shaft 21 and the ball screw-nut 22. A circulating tube 25 is mounted on the outer surface of the tubular part of the ball screw-nut 22. The circulating tube 25 cooperates with a spiral space defined by the spiral threads 21b and 22b, disposed confronting with each other, to form a circulating path through which elements 23 circulate. The circulating tube 25, shaped like U, is provided with tube tongues, located at both ends thereof. A pair of through-holes, not shown, are formed in the ball screw-nut 22. The through-holes are extended from the outer surface of the ball screw-nut to the spiral thread of the inner surface thereof in a state that the through-holes are spaced from each other a distance including a plural number of the threads. The circulating tube 25 is mounted on the outside of the ball screw-nut 22 in a manner that both ends of the circulating tube 25 are inserted into the through-holes and fastened to the ball screw-nut 22 by the combination of a tube holder member 28 and screws 29.

Figure 19:
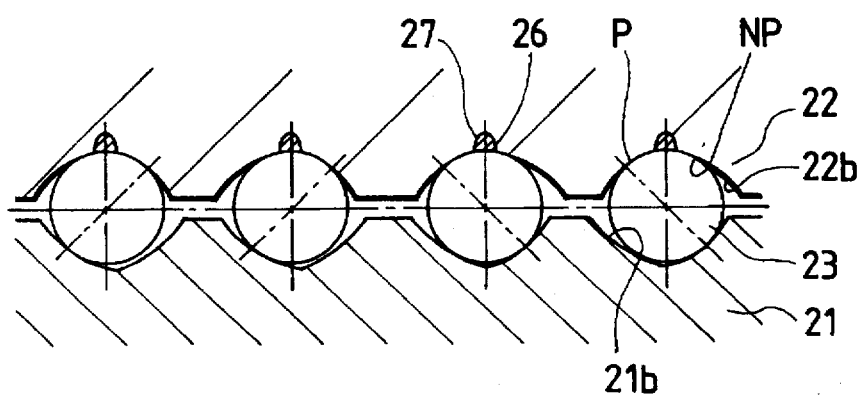
FIG. 19 is an enlarged sectional view showing a spiral space defined by the spiral threads of a screw shaft and a ball screw-nut in the ball screw-nut machine of FIG. 17.

The spiral thread 21b of the screw shaft 21 and the spiral thread 22b on the inner surface of the ball screw-nut 22 are shaped as a Gothic arch thread, as shown in FIG. 19. Each thread includes a load receiving areal part P to contact with the balls 23 and a no-load-receiving areal part NP not to contact with the balls 23. In this embodiment, a small groove 26 is spirally formed in the groove bottom as the no-load-receiving areal part NP of the spiral thread 22b of the ball screw-nut 22. A lubricant supply member 27 as lubricant-contained polymer is bonded or fit to the small groove 26.

When the screw shaft 21 rotates, the balls 23 roll in the direction of the rotation of the screw shaft along a spiral space defined by the spiral threads 21b and 22b, and circulate through the circulating tube 25. With the rolling of the balls 23, the ball screw-nut 22 is linearly fed along the screw shaft 21. When the ball screw-nut machine is driven, lubricant is gradually oozed from the lubricant supply member 27 as lubricant-contained polymer, which is fit to the ball screw-nut 22, and supplied to the balls 23 while contacting the lubricant-contained polymer. The lubricant uniformly spreads over the whole spiral threads 21b and 22b. A stable supply of the lubricant for a long time is ensured. Accordingly, the ball screw-nut machine well runs at a low torque for a long time without any special external supply of the lubricant.

A ball screw-nut machine having such a structure as to apply a preparatory pressure by deviating the pitch of the threads of the screw shaft from that of the threads of the ball screw-nut is frequently used. In this type of the machine, the flank face to be in contact with the balls is one of the faces of the thread. Accordingly, a lubricant supply member may be placed in a small groove, which is formed in the flank face of the groove, as shown in FIGS. 15 and 16.

Modifications of the fifth to eighth embodiments using the lubricant-contained polymer for the lubricant supply will be described. The linear guide machine incorporating the invention may be modified such that a grease nipple G is attached to a lubricant supply port 11 of the slider 2, and lubricant is supplied from the grease nipple G to the slider 2. The ball screw-nut machine incorporating the invention may be modified such that the inner space thereof is filled with grease in the stage of manufacturing the machine. The modification employing both the lubricant supply method using the lubricant supply member and the direct lubricant supply method for the lubricant supply has the following fail-safe effect. If the lubricant supply pipe is clogged, the lubricant supply is continued since the lubricant supply member normally operates to supply lubricant. Accordingly, the thus modified machine is free from the trouble by the clogging of the oil pipe, such as the abnormal wear and the shortening of the machine life.

It is evident that the present invention may be applied to other linear guide machines than the linear guide machine described above as the fifth to eighth embodiments. For example, while two load element rolling grooves are formed each side of the slider in those embodiments, three or more grooves may be used. The balls as rolling elements may be substituted by cylinders. Further, the present invention is applicable to other ball screw-nut machines than those described above.

Figure 20:
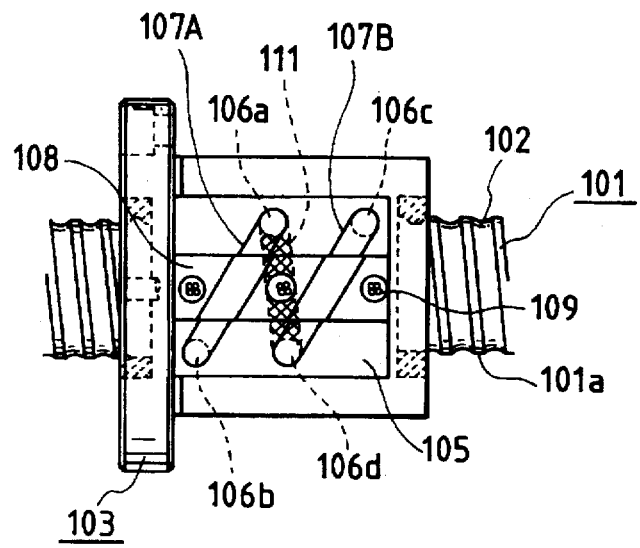
FIG. 20 is a plan view showing a ball screw-nut machine according to a ninth embodiment of the present invention.
Figure 21:
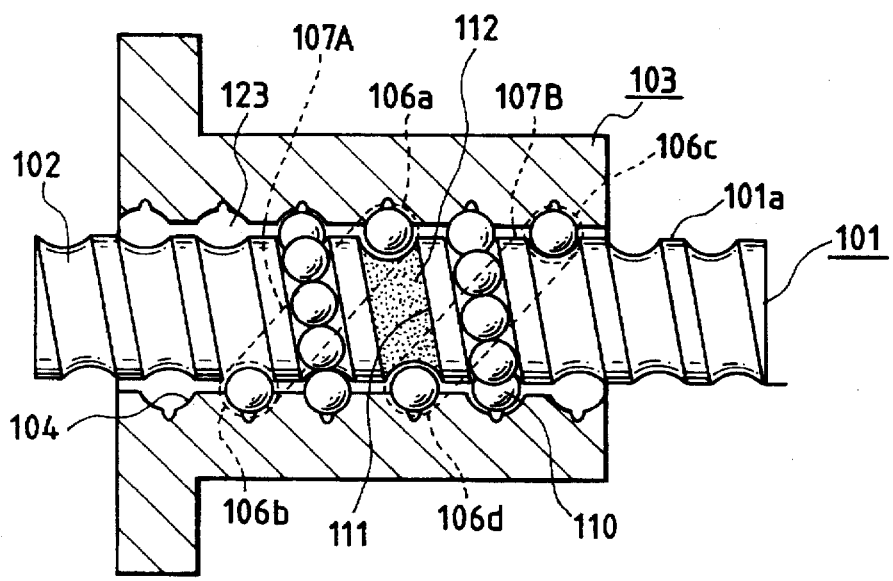
FIG. 21 is a longitudinal sectional view showing the ball screw-nut machine of FIG. 20.
Figure 22:
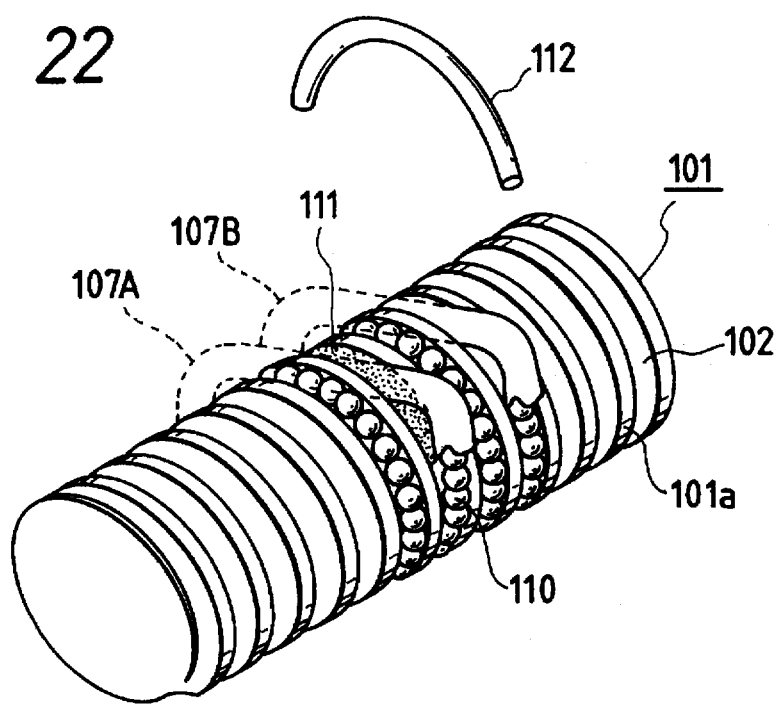
FIG. 22 is a perspective view, partly broken, showing the ball screw-nut machine of FIG. 20.
Figure 23:
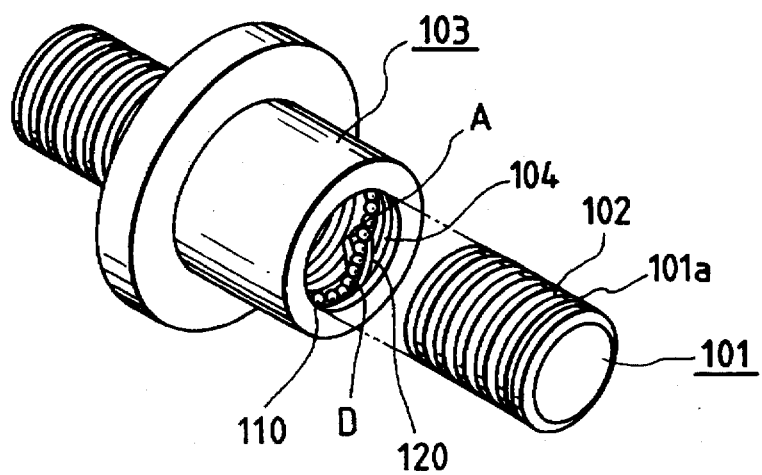
FIG. 23 is a perspective view showing a ball screw-nut machine of the circulation die type according to a tenth embodiment of the present invention.
Figure 24:
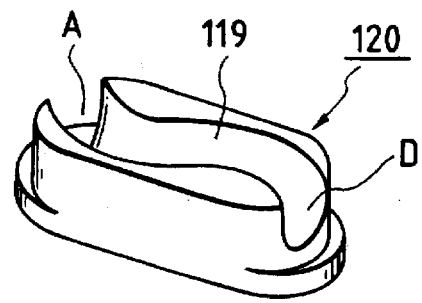
FIG. 24 is an enlarged perspective view showing a circulation die used in the ball screw-nut machine of FIG. 23.

FIGS. 20 to 22 show a ball screw-nut machine of the tube circulating type according to a ninth embodiment of the present invention.

As shown, a spiral thread 102 is formed on the outer surface 101a of a screw shaft 101. A ball screw-nut 103, tubular in shape, is screwed to the screw shaft 101. A spiral thread 104 is formed on the inner surface of the ball screw-nut 103. The spiral thread 104 confronts with the spiral thread 102 of the screw shaft 101 when the ball screw-nut 103 receives the screw shaft 101. A part of the outer surface of the ball screw-nut 103 is cut into a flat area 105. Two pairs of through-holes 106a and 106b, and 106c and 106d are formed in the flat area 105 of the ball screw-nut 103. These through-holes reach the spiral thread 104 of the ball screw-nut 103. The pair of the through-holes 106a and 106b are diagonally disposed with respect to one screw thread 104 such that the through-hole 106a is located at the right upper position and the through-hole 106b is located at the left lower position. Another pair of the through-holes 106c and 106d is also disposed in a similar fashion. The through-holes 106a and 106d are spaced apart from each other a distance of the half turn of the spiral thread 104.

Two circulating tubes 107A and 107B, shaped like U, are mounted in parallel with each other using the circulating tubes 107A and 107B. To be more specific, both ends of the circulating tube 107A are inserted into the paired through-holes 106a and 106b, while both ends of the circulating tube 107B are inserted into the paired through-holes 106c and 106d. These circulating tubes 107A and 107B thus inserted are fastened to the flat area 105 by the combination of a mounting plate 108 and screws 109.

When the screw shaft 101 is inserted into the inner hole of the ball screw-nut 103, the spiral thread 102 confronts with the spiral thread 104 of the ball screw-nut 103, to form a spiral load ball rolling space, circular in cross section. The load ball rolling space, and two circulating tubes 107A and 107B form two ball circulating paths. A number of balls 110 are placed in the circulating paths so that the balls move along each of the circulating paths by turning over and over.

The balls circulate through one of the circulating paths in the following way. The balls enter from the through-hole 106a, for example, into the spiral load ball rolling space, spirally move by about one turn of the screw shaft 101, reach the through-hole 106b, enter the ball circulating tube 107A, move along the tube, pass through the space again, and return to the through-hole 106a. The balls circulate through the other circulating path in the following way. The balls enter from the through-hole 106c, into the spiral load ball space, spirally move by about one turn of the screw shaft 101, reach the through-hole 106d, enter the ball circulating tube 107B, move along the tube, pass through the space again, and return to the through-hole 106c.

A spiral block space 111 for blocking the traveling of the balls is provided between the through-hole 106a of one of the two ball circulating paths and the through-hole 106b of the other. The length of the spiral block space 111 is about ½ of one turn of the load ball rolling space extending along the screw threads 102 and 104.

The spiral block space 111 is substantially filled with lubricant-contained polymer. The lubricant-contained polymer serves as a lubricant supply member 112, shaped like a half ring.

The lubricant-contained polymer of the lubricant supply member used for the ball screw-nut machine may be made of the materials already described. In manufacturing the ball screw-nut machine of the type in which the lubricant-contained polymer is also used as a sealing member, a screw shaft of a ball screw-nut used or a screw shaft that is 5 to 100 μm larger than that is placed and molded at the central part of a given mold. In the resultant product, a gap between the ball screw-nut and the screw shaft can be reduced when comparing with that (approximately 0.3 to 1 mm) of the conventional machine using the sealing member. In addition to this advantage, an oil film formed by lubricant oozed from the lubricant-contained polymer further enhances the sealing properties.

To form the lubricant-contained polymer member as the lubricant supply member 112, paraffin hydrocarbon oil of 80 weight % as lubricant is mixed into polyethylene containing low molecular weight polyethylene of 14 weight % (molecular weight:$1\times10^3$ to $1\times10^5$) and ultra-high molecular weight polyethylene of 6 weight % (molecular weight:$1\times10^6$ to $5\times10^6$). The resultant mixture is heated and molten. The molten mixture is injected into a mold, and cooled and solidified under a pressure.

Alternatively, polyethylene and paraffin hydrocarbon oil are mixed and molten by heat, and the liquidized mixture is injected into the spiral block space 111, and then cooled and solidified.

The operation of the ball screw-nut machine thus constructed will be described.

When the screw shaft 101 turns, the balls 110 moves by rolling in the direction of the rotation of the screw shaft 101 along the spiral load ball rolling space defined by the screw threads 102 and 104 oppositely arranged, and pass through the circulating tubes 107A and 107B. In this way, the balls circulate through the ball circulating paths. The ball screw-nut 103 is linearly moved along the screw shaft 101 through the rolling of the balls 110. When the ball screw-nut machine is thus operated, lubricant is oozed from the lubricant supply member 112 of the lubricant-contained polymer retained in the spiral block space 111 of the ball screw-nut 103. The oozed lubricant is supplied to the screw threads 102 and 104. The lubricant uniformly spreads over the balls 110 rolling the load ball rolling space defined by the threads 102 and 104. A proper lubricant film is formed. A stable supply of the lubricant for a long time is ensured. Accordingly, the ball screw-nut machine well runs at a low torque for a long time without any special external periodic supply of the lubricant. There is no need of using an expensive oil supply system. The machine is free from a maintenance work, such as a periodic inspection. Additionally, the machine is free from the problem of mixing the leaked lubricant with cutting oil.

The lubricant is stored in the lubricant-contained polymer. Accordingly, the lubricant is less dissipated, and not significantly oxidized since it is not exposed to air. An optimum amount of lubricant is supplied to the load ball rolling space. The problem of the oil dispersion by an excessive supply of lubricant and dust generation resulting from the oil dispersion never arises.

FIGS. 23 to 26 show a ball screw-nut machine of the die circulation type according to a tenth embodiment of the present invention.

Figure 25:
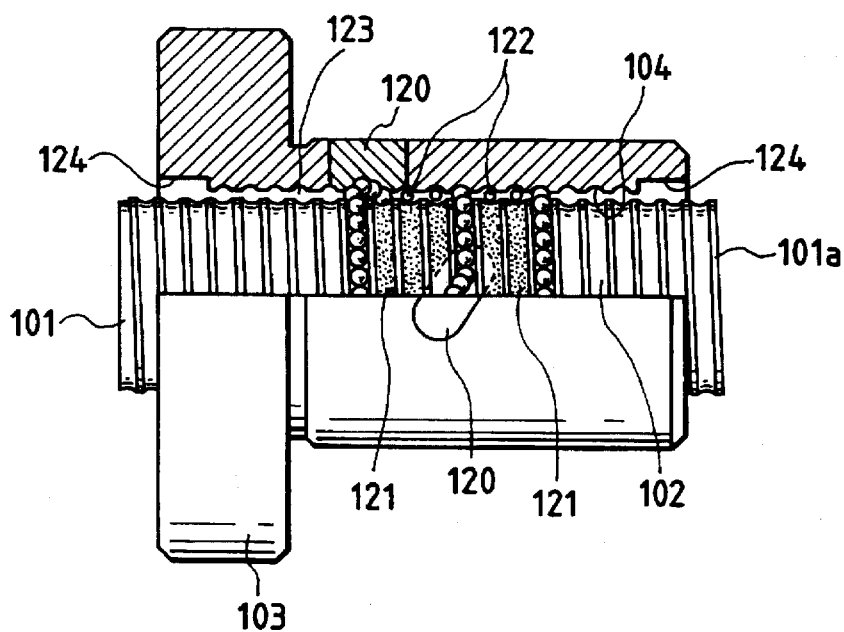
FIG. 25 is a side view, partly broken, showing the ball screw-nut machine of FIG. 23.

A plural number of circulation dies 120 are assembled into the tubular part of the ball screw-nut 103 screwed to the screw shaft 101. Each of the circulation dies 120 includes an S-shaped path 119 into which balls 110 rolling in the spiral load ball rolling space defined by the oppositely arranged screw threads 102 and 104 are guided for circulation. In a first ball circulating path, the balls 110 enters the S-shaped path 119 from a point A of the S-shaped path 119 of the circulation die 120, advances therealong, gets over the outer surface (land) 101a of the screw shaft 101, pass through the load ball rolling space, and return to the point A. And the balls enters again the S-shaped path 119 and traces the same route. In this way, the balls circulate. This circulating operation of the balls is likewise performed in another circulating path including another circulation die 120, located about two turns of the load ball rolling space apart form the first ball circulating path. In the instance of FIG. 25, three circulating dies are used, and three ball circulating paths including these dies are formed.

Figure 26:
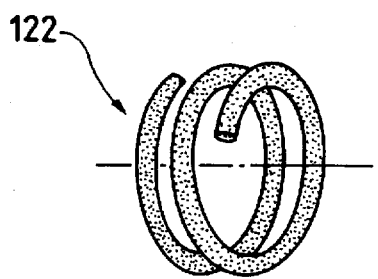
FIG. 26 is a perspective view showing a lubricant supply member used in the ball screw-nut machine of FIG. 23.

A spiral block space 121 for blocking the traveling of the balls is provided between the ball circulating paths. The length of the spiral block space 121 is substantially equal to two turns of the load ball rolling space extending along the screw threads 102 and 104. The spiral block space 121 is substantially filled with lubricant-contained polymer. The lubricant-contained polymer serves as a lubricant supply member 122. The lubricant-contained polymer of the lubricant supply member used for the ball screw-nut machine may be made of the materials as already described. The lubricant supply member 122 may be previously coiled as shown in FIG. 26 or formed by injecting lubricant-contained polymer liquid into the spiral block space 121 and solidifying it.

The operation and the useful effects of this embodiment are comparable with those of the ninth embodiment.

In the ninth and tenth embodiments described above, a spiral space 123 (except the load ball rolling space and the spiral block space 111) defined by the oppositely arranged screw threads 102 and 104 of the ball screw-nut 103 and the screw shaft 101 may be filled with grease or supplied with lubricant.

In another way to fill the spiral space 123, after the spiral space 123 is filled with a mixture of raw polymer of the lubricant-contained polymer and lubricant, the mixture filled is heated to be molten, and then cooled. In this case, the lubricant-contained polymer may be injected till it reaches both ends of the ball screw-nut 103. The lubricant-contained polymer reaching there is used for sealing at both ends of the ball screw-nut 103.

If required, the ball screw-nut machine may be modified such that two spatial portions 124 are formed at both ends of the ball screw-nut 103, and lubricant-contained polymer is placed in one or two spatial portions 124.

It is evident that the present invention may be applied to other linear guide machines than the linear guide machine described above as the embodiments. For example, while two load element rolling grooves are formed in each side of the slider in those embodiments, three or more grooves may be used. The balls as rolling elements may be substituted by rolls.

As seen from the foregoing description, in a linear motion machine in which a number of rolling elements are interposed between a linearly extending guide shaft and a moving body linearly moved while being guided by the guide shaft, and the elements circulate along element rolling grooves formed in the moving body while rolling within the grooves, a lubricant supply member made of lubricant-contained polymer is located near a load-receiving areal part of the element rolling grooves. The lubricant is oozed out of the lubricant supply member and automatically and uniformly supplied to the elements and the load element rolling paths. An optimum amount of lubricant can be supplied for a long time, automatically and stably. Therefore, a long life and maintenance-free linear motion machine is realized.

In a linear guide machine of the present invention, a lubricant reservoir made of lubricant-contained polymer is located in a gap between the guide rail and the slider. With this structure, the lubricant is oozed out of the lubricant reservoir, and automatically and uniformly supplied to the elements and the load element rolling paths. An optimum amount of lubricant can be supplied for a long time, automatically and stably. Therefore, a long life and maintenance-free linear guide machine is realized.

In a ball screw-nut machine of the present invention, a lubricant supply member made of lubricant-contained polymer is located in a spiral ball block space in the ball screw-nut. With this structure, the lubricant is oozed out of the lubricant supply member, and automatically and uniformly supplied to the contact faces of the balls and the ball screw thread. A good lubrication of the machine is secured for a long time. There is no need of using an expensive oil supply system. Therefore, a long life and maintenance-free screw-nut machine is realized.

What is claimed is:

1. A linear motion machine comprising:

a linearly moving body having element rolling grooves that define a rolling surface;

a linearly extending guide shaft for guiding said moving body;

a number of rolling elements interposed between said linearly extending guide shaft and said linearly moving body, said elements circulating along said element rolling grooves of said moving body while rolling within said grooves; and a lubricant supply member formed of lubricant-containing polymer disposed in a lubricant supply member receiving groove that is formed in said rolling surface, said receiving groove is smaller than said element rolling groove, and said lubricant supply member is fastened to said receiving groove, wherein said lubricant supply member contacts said rolling elements.

2. The linear motion machine of claim 1, wherein said lubricant supply member is located near a load-receiving areal part of said element rolling grooves.

3. The linear motion machine of claim 1, wherein said lubricant-containing polymer member is formed by mixing paraffin hydrocarbon oil of 80 weight % as lubricant into polyethylene containing low molecular weight polyethylene of 14 weight % (molecular weight: $1\times10^3$ to $5\times10^3$) and ultra-high molecular weight polyethylene of 6 weight (molecular weight: $1\times10^6$ to $5\times10^6$).

4. The linear motion machine of claim 1, wherein said linear motion machine is of a linear guide machine type in which said element rolling groove comprising a first upper and lower element rolling grooves formed in said linearly extending guide shaft and a second upper and lower element rolling grooves formed in said linearly moving body.

5. The linear motion machine of claim 4, wherein a preparatory pressure is applied by deviating a pitch of said first upper and lower element rolling grooves from that of said second upper and lower element rolling grooves, and one face of each element rolling groove comes into contact with said rolling elements.

6. The linear motion machine of claim 5, further comprising a lubricant supply member receiving groove formed at a no-load-receiving areal part of said second element rolling groove, said lubricant supply member receiving groove being filled with said lubricant supply member.

7. The linear motion machine of claim 6, wherein said lubricant supply member receiving groove is formed over substantially a half of said no-load-receiving areal part.

8. The linear motion machine of claim 6, wherein said lubricant supply member is fastened to said groove.

9. The linear motion machine of claim 6, wherein said lubricant supply member receiving groove is formed over an entirety of said no-load-receiving areal part.

10. A linear motion machine comprising:

an axially extending guide rail having at least one element rolling groove on an outer surface thereof;

a slider assembled to said guide rail comprising at least one load element rolling groove which opposes said element rolling groove and return paths coupled through curved paths with both ends of said load element rolling grooves;

a number of rolling elements retained in said load element rolling grooves of said slider so as to circulate through said curved paths and said return paths;

a side seal disposed on said slider and an underseal disposed on said slider; and a lubricant reservoir located in a gap between said guide rail and said slider to supply lubricant to the element rolling groove and a portion of one of the side seal and the underseal that is in slidable contact with the guide rail;

wherein said lubricant reservoir is formed of a solid-state lubricant-containing polymer.

11. The linear motion machine of claim 10, wherein said lubricant reservoir is sheet-like shaped.

12. The linear motion machine of claim 10, further comprising axially extending shallow grooves formed on both sides of a top surface of a concavity of said slider, and said lubricant reservoir is shaped like plates and placed in said shallow groove.

13. The linear motion machine of claim 10, wherein said lubricant reservoir is shaped like narrow strips fastened to a top edge of said element rolling groove on both sides of said concavity of said slider.

14. The linear motion machine of claim 10, wherein said lubricant reservoir comprises lubricant-containing polymer members fastened to a flat area of a cap, located at both ends of said slider and face said guide rail.

* * * * *